(No Model.)
B. F. RUDY.
PLOW ATTACHMENT.
No. 585,791. Patented July 6, 1897.
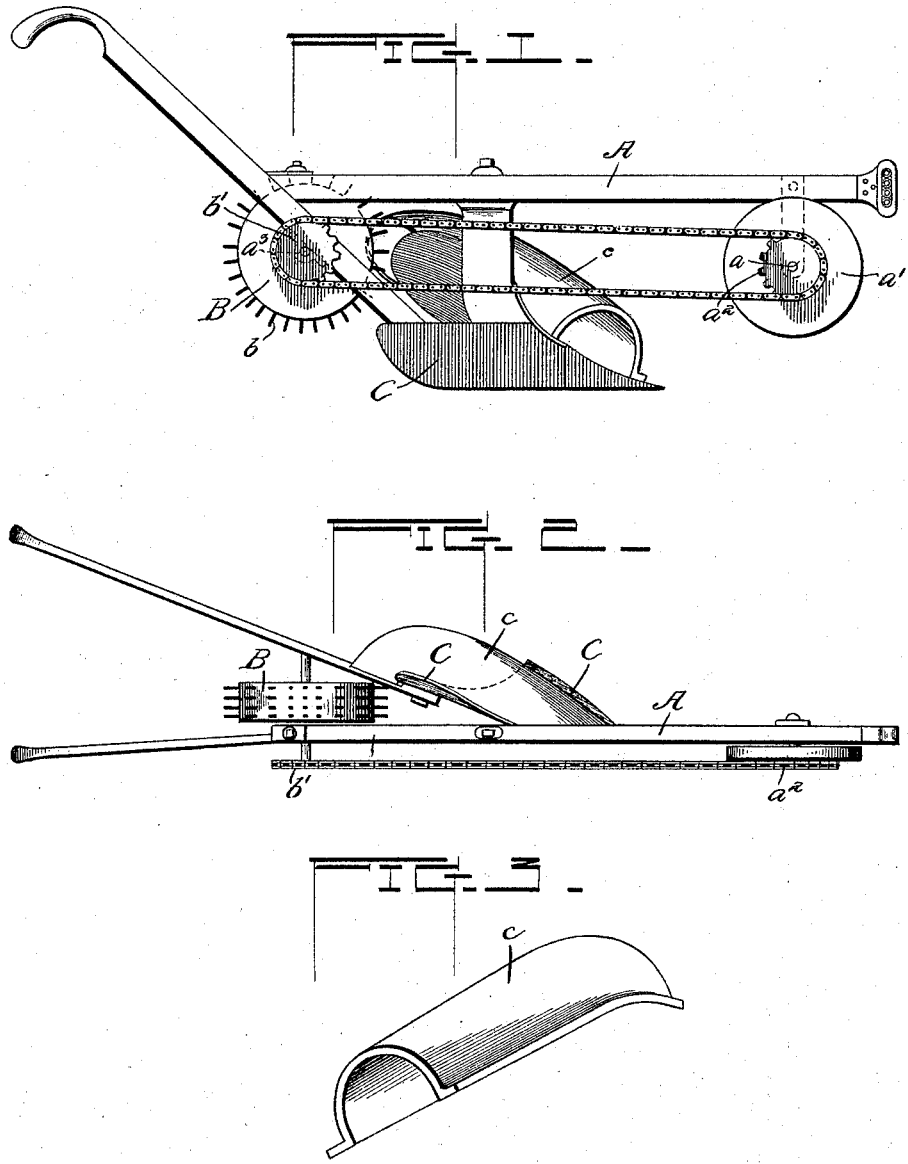
WITNESSES
Milton O'Connell,
J. C. Tappan
INVENTOR
Benjamin F. Rudy,
by John Wedderburn
Attorney

UNITED STATES PATENT OFFICE.

BENJAMIN F. RUDY, OF BOUND BROOK, NEW JERSEY, ASSIGNOR OF ONE-HALF TO JOHN JOSEPHS, OF SAME PLACE.

PLOW ATTACHMENT.

SPECIFICATION forming part of Letters Patent No. 585,791, dated July 6, 1897.

Application filed October 24, 1896. Serial No. 609,920. (No model.)

*To all whom it may concern:*

Be it known that I, BENJAMIN F. RUDY, a citizen of the United States, residing at Bound Brook, in the county of Somerset and State of New Jersey, have invented certain new and useful Improvements in Plow Attachments; and I do hereby declare the following to be a full, clear, and exact description of the invention, such as will enable others skilled in the art to which it appertains to make and use the same.

My invention relates to an improvement in plows, and more particularly to an attachment therefor, my object being to provide an attachment by which the clods of earth will be pulverized instead of left intact along the furrow.

To this end the invention consists in the various matters hereinafter described and claimed.

In the accompanying drawings, which illustrate the invention, Figure 1 is a side view of a plow with my attachment applied. Fig. 2 is a top plan view thereof; and Fig. 3 is a detail view of the plowshare, shield, and clod crusher or pulverizer.

Referring now more particularly to the drawings, A represents the beam of the plow, to which are attached the usual handles and members for the attachment of the horse. Removably secured upon a journal $a$, depending from the front of the plow-beam, is a wheel $a'$, extending from one of the faces of which are a series of pins $a^2$, these pins forming sprockets.

Journaled in bearings $a^3$, depending from the rear of the frame of the plow, is a roller B, extending across the plow-frame, said roller having upon its periphery a series of teeth $b$. These teeth project somewhat beyond the front of the top of the plowshare C, so that motion being imparted to the roller any clods of dirt which may be carried up the front of the plowshare are acted upon by the teeth $b$ and crushed. In order to direct the clods to the teeth of the roller, a shield or plate $c$ is removably attached upon the front of the plowshare, and which provides, in effect, a chute to direct the earth to the clod-crushing roller. A sprocket-chain passing over the pins or sprockets upon the forward wheel $a$ and over a corresponding sprocket $b'$ upon the shaft of the roller B causes continuous rotation of said roller.

It is obvious that if the plowshare is properly seated the teeth upon the roller $b'$ will bear upon the ground, and this alone will cause rotation of the roller during the forward movement of the plow, thus dispensing with the necessity of employing the forward wheel $a$ and the sprocket connections.

By the use of a plow provided with the present attachment harrowing of the ground becomes unnecessary, as the earth is plowed and all the clods raised by the plow are directed by the shield or plate C to the teeth of the roller, said clods being broken and crushed by the teeth. As the wheel $a$, the rollers B, and the shield C are all made detachable from the plow-frame the plow can be stripped of them and used as is customary. The removable members can be readily attached to any plow in common use.

Having thus described my invention, what I claim as new, and desire to secure by Letters Patent, is—

1. A plow comprising a frame, a plowshare upon said frame, a clod-crusher upon said frame, and a shield or plate secured upon said plowshare for directing the clods to the clod-crusher, substantially as described.

2. A plow comprising a frame, a plowshare upon said frame, a clod-crusher upon said frame, and a plate upon said plowshare for directing the clods to the clod-crusher, said plate being removably secured to the plowshare, substantially as described.

In testimony whereof I have signed this specification in the presence of two subscribing witnesses.

BENJAMIN F. RUDY.

Witnesses:
JOHN C. WELLS,
JOHN JOSEPHS.